United States Patent [19]

Wilson

[11] 4,315,294

[45] Feb. 9, 1982

[54] COMPUTER TAPE DRIVE AND CLEANER APPARATUS

[76] Inventor: Terrance J. Wilson, 1804 Madison, Bellevue, Nebr. 68005

[21] Appl. No.: 133,980

[22] Filed: Mar. 26, 1980

[51] Int. Cl.³ ................ G11B 25/06; B08B 1/02
[52] U.S. Cl. ...................... 360/137; 369/72; 360/128; 15/100
[58] Field of Search ............ 274/47; 15/100, 210 R, 15/214; 360/137, 128, 90; 369/72

[56] References Cited

U.S. PATENT DOCUMENTS

| | | | |
|---|---|---|---|
| 2,325,999 | 8/1943 | Snyder | 15/214 |
| 3,349,373 | 10/1967 | Kleist | 360/90 |
| 3,370,982 | 2/1968 | Hayunga | 360/137 |
| 3,602,940 | 9/1971 | Barbeau | 274/47 |
| 3,616,478 | 11/1971 | Marty | 274/47 |
| 3,961,375 | 6/1976 | Mika | 360/137 |
| 4,065,798 | 12/1977 | Sugisaki | 360/128 |
| 4,081,878 | 4/1978 | Seidel | 360/137 |

OTHER PUBLICATIONS

DCA Circular 310-D70-30, para. 7d(1), p. 3-64.

Primary Examiner—James W. Moffitt
Assistant Examiner—Alan Faber

[57] ABSTRACT

A computer tape drive and cleaner unit includes a housing for rotatably supporting a tape supply reel and tape take-up reel thereon. Guide means are provided for operatively directing the tape past a head assembly which includes read and write heads and/or an erase head. A tape cleaner apparatus is also supported on the housing and includes a replaceable cleaner element arranged in engagement with the computer tape as it is transferred between the take-up and supply reels.

14 Claims, 2 Drawing Figures

COMPUTER TAPE DRIVE AND CLEANER APPARATUS

BACKGROUND OF THE INVENTION

The present invention is directed generally to magnetic tape handling equipment for a computer system and more particularly to a hybrid apparatus wherein a computer tape may be both erased and cleaned on a single run through the apparatus.

Computer processing centers are generally equipped with several tape drive units and at least one tape cleaner unit. This is because preferred tap handling practices require that the magnetic tapes be cleaned after a certain number of uses. Reference is made, for example, to the United States Defense Communications Agency (DCA) Circular 310-D70-30, paragraph 7d(1), page 3-64 which states "all magnetic tapes will be cleaned at the time of purging after being used four times." Presently, tapes are first mounted on the tape cleaner to be cleaned, after which they are removed and remounted on a magnetic tape unit to be purged or erased. Such an operation is very costly both in terms of equipment and labor.

First, the purchase of a tape cleaning unit may involve an expenditure of several thousands of dollars and maintenance of the tape cleaner unit inherently necessitates additional expense. Secondly, much labor is required for mounting and remounting the tapes on the cleaner unit and tape drive unit. Additional man hours are consumed coordinating the timing between the tape drive units and tape cleaner units since a given tape must be sequentially directed first through one and then through the other. Finally, tape longevity suffers due to the multiple runs required to both erase and clean a given tape.

Accordingly, a primary object of the invention is to provide a magnetic tape handling unit which is capable of both cleaning a tape and transferring information onto or from the tape.

A more specific object is to provide a combination tape drive and tape cleaner unit which is capable of both erasing and cleaning a tape on a single run through the unit.

Another object is to provide a combination tape drive and tape cleaner unit which thereby eliminates the expense of duplicate drive apparatus for separate cleaning and erasing functions.

Another object is to provide a combined tape which enables the processing of computer tapes in less time and with less manual labor.

Another object is to increase the longevity of computer tapes by providing a unit which both cleans and erases a tape on a single run through the unit.

Another object is to provide a combination tape drive and tape cleaner unit which may be easily and inexpensively constructed by modifying existing tape drive units.

SUMMARY OF THE INVENTION

The combination tape drive and tape cleaner unit of the present invention includes a housing with means for rotatably supporting a tape supply reel and a tape take-up reel, a read, write and erase head assembly and tape guides for directing the magnetic tape between the reels past the head assembly. A tape cleaner apparatus is supported on the housing and includes a replaceable cleaner element arranged in engagement with the tape for simultaneously cleaning the tape when it is driven past the head assembly. The tape cleaner apparatus of the invention may include a blade holder and tape cleaning blade supported therein as well as one or more tape cleaning tissue holders adapted to support a tissue material in engagement with the tape for removing foreign matter therefrom. The present invention further contemplates a method and kit for modifying a computer tape drive unit to provide the added capability of cleaning a magnetic tape mounted thereon.

DESCRIPTION OF THE PREFERRED EMBODIMENT

Figures 1, 2:
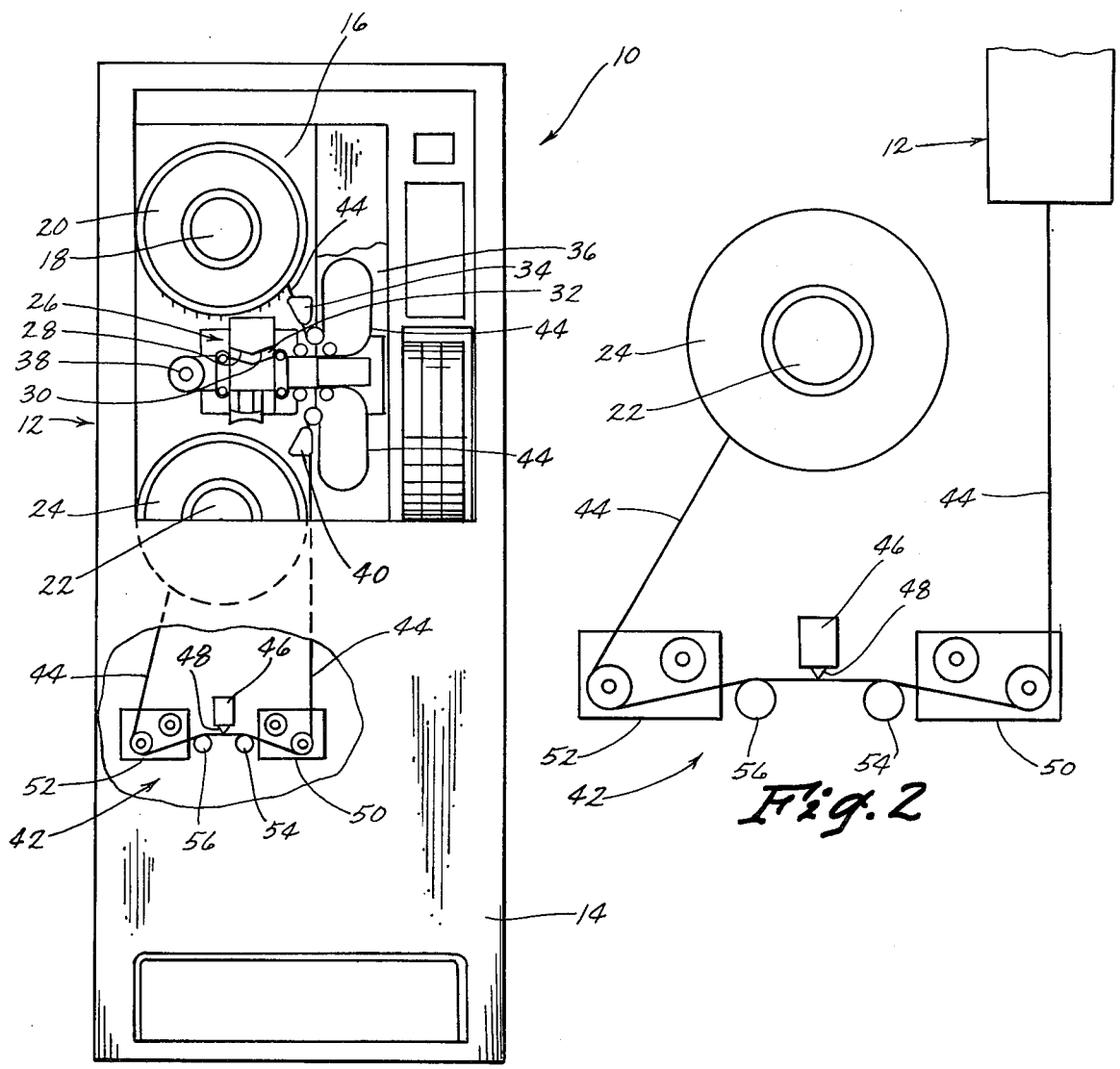
FIG. 1 is a front elevational view of a combination tape drive and tape cleaner unit according to the invention.
FIG. 2 is a diagrammatic view of the tape cleaner unit and tape guides associated therewith.

The combination tape drive and tape cleaner unit 10 of the present invention is shown in FIG. 1 as a modified version of an RCA model 70/442 magnetic tape unit which is one of the input-output peripheral devices used with any RCA Spectra 70 Computer System. It is to be understood that the modified RCA tape unit is shown by way of example only and that various other commercially available computer tape drive units may be modified to achieve the combination structure of the present invention.

Briefly, the tape drive unit 10 includes a housing 12 having a front panel 14 which may be opened to provide access to components mounted on the housing front wall 16. These include a first hub 18 for rotatably supporting a tape supply reel 20 and a second hub 22 for rotatably supporting a tape take-up reel 24. The supply and take-up reels 20 and 24 are supported in vertically spaced apart relation with a magnetic head assembly 26 interposed between them. Head assembly 26 includes a read head 28, a write head 30 and an erase head 32. Magnetic tape wound on the supply reel 20 is directed over a coarse guide 34 and into a vacuum column sensor assembly 36 from which the tape is directed through the head assembly 26 past the read head 28, write head 30 and erase head 32, around the drive capstan 38 and back over several roller guides to the vacuum column sensor assembly 36, over coarse guide 40 to the take-up reel 24. The tape drive unit, as thus far described, is conventional.

The present invention contemplates a modification of a magnetic tape drive unit to provide the added capability of professionally cleaning the magnetic tape which is mounted on it. A cleaning apparatus, indicated generally at 42 in FIG. 1, is mounted on the housing 12 below the take-up reel 24 and has the magnetic tape 44 guided therethrough on its way to the take-up reel 24.

Referring to FIG. 2, the tape cleaning apparatus 42 includes a blade holder assembly 46 for a tape cleaning blade 48 which is arranged between a pair of tissue cartridge assemblies 50 and 2. A pair of ½ inch tape guides 54 and 56 are rotatably supported between the blade holder assembly 46 and tissue cartridge assemblies 50 and 52 for guiding the tape 44 between the tissue cartridge assemblies past the blade holder assembly 46 and in engagement with the tape cleaning blade 48.

Both the blade holder assembly 46 and tissue cartridge assemblies 50 and 52 may be provided as conventional commercially available components of existing tape cleaning units. For example, the blade holder assembly 46 may be provided as an enduron blade holder assembly referred to by part No. A10872-35 as part of a deck assembly A10872. The corresponding tissue cartridge assemblies are identified as part No. A10872-84.

In operation, magnetic tape from the supply reel 20 is trained through the head assembly 26 in the usual manner but, from there, the tape is directed though the cleaning apparatus 42 on its way to the take-up reel 24. Specifically, tape from coarse guide 34 is directed around the tissue cartridge assembly 50, over tape guide 54 and into engagement with the tape cleaning blade 48. From there, the tape is trained about tape guide 56 and around the tissue cartridge assembly 52 from which it is directed onto the take-up reel 24. A tape is generally erased by activating the erase head and running the entire tape through the machine in a forward direction from the supply reel to the take-up reel. By directing the tape through the cleaning apparatus of the present invention, the magnetic tape may be simultaneously purged and cleaned in a single run through the machine.

The combined tape drive and tape cleaner unit of the invention may be achieved by providing a kit for modifying conventional computer tape drive units. Such a kit would include a tape cleaner apparatus such as a cleaning blade and holder and/or a tissue cartridge assembly including a replaceable cleaning spool for engaging the magnetic tape, means for mounting the tape cleaner apparatus on the housing of the tape drive unit, and means for guiding the tape into engagement with the tape cleaning element for cleaning the tape as it is run through the tape drive unit. Accordingly, a novel method for simultaneously purging and cleaning a magnetic tape has also been disclosed herein.

The position of the tape cleaning apparatus 42 below the take-up reel 24 is convenient for selective operation of the cleaning apparatus, i.e. tape from the head assembly may be fed to either the tape cleaning apparatus or directly to the take-up reel, this position is not critical to the present invention. This position does accommodate the mounting of commercially available cleaning apparatus on the housing but as newer and smaller tape cleaning devices become available, the options for placement on conventional tape drives increase accordingly. Likewise, whereas a tape cleaning blade and tissue cleaners are preferred apparatus for cleaning magnetic tapes presently, it is apparent that other types of tape cleaning apparatus may be mounted on tape drive units with appropriate guides for operation according to the invention.

Thus the combination tape drive and cleaner unit of the present invention enables a magnetic tape to be both purged and cleaned on a single run through the hybrid unit of the invention. The bulk of the expense for conventional tape cleaning apparatus is for the mounting and drive unit which allows the tape to traverse the cleaning element. The present invention eliminates the need to purchase and maintain the expensive tape cleaning units. By a relatively simple modification to an existing tape drive unit, it is given the capability of cleaning tapes as well. The man hours involved in mounting and dismounting tapes from conventional tape cleaners and in coordinating the cleaning and purging of tapes on separate units are eliminated. Finally, even tape longevity is enhanced by the present invention since a single run through a tape drive unit is effective to both purge and clean the tape.

Thus there has been shown and described an apparatus and method for combining the tape drive and tape cleaner functions in a single unit which accomplishes at least all of the stated objects.

I claim:

1. A combination tape drive and tape cleaner unit for a computer system wherein information is stored on a magnetic tape carried on a tape supply reel and tape take-up reel, said unit comprising
 a housing,
 means for rotatably supporting a tape supply reel on said housing,
 means for rotatably supporting a tape take-up reel on said housing,
 a read-write head assembly mounted on said housing and adapted to read and write information on a magnetic tape carried on the supply and take-up reels,
 guide means for operatively directing the tape past said read-write head assembly whereby information may be written thereon or read therefrom,
 a capstan assembly for driving the tape in a forward direction from said supply reel past said read-write head assembly and to said take-up reel and in a reverse direction from said take-up reel, past said read-write head assembly and onto said supply reel, and
 a tape cleaner apparatus supported on said housing and adapted to contact tape being driven between said supply reel and take-up reel, said tape cleaner apparatus including a blade holder assembly and a blade supported therein and arranged in engagement with said tape for cleaning the same.

2. The combination tape drive and tape cleaner unit of claim 1 wherein said tape cleaner apparatus further comprises a tape cleaning tissue holder adapted to support a tissue material in contact with said tape for removing foreign matter therefrom.

3. The combination tape drive and tape cleaner unit of claim 2 wherein a pair of said tape cleaning tissue holders are arranged on opposite sides of said blade holder assembly whereby tape is at least partially guided by the tissue material of said tape cleaning tissue holders for movement past the cleaning blade.

4. The combination tape drive and tape cleaner unit of claim 3 further comprising a pair of tape guides interposed between said cleaning blade and pair of tape cleaning tissue holders to further guide the tape for movement past the cleaning blade.

5. The combination tape drive and tape cleaner unit of claim 1 further comprising tape guide means for supporting a tape at a position to be cleaned by said tape cleaner apparatus.

6. The combination tape drive and tape cleaner unit of claim 1 wherein said tape supply reel and tape take-up reel are situated in vertically spaced-apart relation, said head assembly being mounted between said take-up reel and supply reel and said tape cleaner apparatus being supported at a position below the lowermost reel.

7. The combination tape drive and tape cleaner unit of claim 1 further comprising an erase head operatively associated with said head assembly for selectively erasing information on a tape.

8. A combination tape drive and tape cleaner unit for a computer system, comprising
 a housing,
 a tape supply reel rotatably supported on said housing, a tape take-up reel rotatably supported on said housing, an elongated magnetic tape carried on at least one of said reels and adapted to be transferred between said reels, an erase head assembly mounted on said housing and adapted to erase information from said magnetic tape, guide means for operatively directing the tape past said erase head assembly whereby information on said tape may be erased therefrom, means for driving the tape in a forward direction from said supply reel past said erase head assembly and to said take-up reel, and a tape cleaner apparatus supported on said housing and adapted to contact the magnetic tape driven between said supply reel and take-up reel, said tape cleaner apparatus including a replaceable cleaner element arranged in engagement with said tape for cleaning the same.

9. The combination tape drive and tape cleaner unit of claim 8 wherein said tape cleaner apparatus includes a blade holder and a tape cleaning blade supported therein.

10. The combination tape drive and tape cleaner unit of claim 9 wherein said tape cleaner apparatus further comprises a tape cleaning tissue holder adapted to support a tissue material in contact with said tape for removing foreign matter therefrom.

11. The combination tape drive and tape cleaner unit of claim 8 further comprising a read-write head assembly mounted on said housing and adapted to read and write information on said magnetic tape.

12. A method of modifying a computer tape drive unit to provide the added capability of cleaning a magnetic tape operatively mounted thereon, said tape drive unit including a housing, means for rotatably supporting a tape supply reel and tape take-up reel on the housing and a magnetic head assembly mounted on the housing and adapted to read, write and erase information on a tape carried on the supply and take-up reels, said method comprising, providing a tape cleaner apparatus including a tape cleaner element, mounting the tape cleaner apparatus on said housing and thereby positioning said tape cleaner element for engagement with a tape carried on the supply and take-up reels for cleaning the same, providing at least one tape guide, and mounting said tape guides on said housing at positions for guiding the tape driven between the supply and take-up reels past the tape cleaner apparatus and in engagement therewith, thereby to clean the tape.

13. The method of claim 12 wherein said tape cleaner apparatus includes a blade holder and a tape cleaning blade supported therein.

14. The method of claim 13 wherein said tape cleaner apparatus further comprises a tape cleaning tissue holder.

* * * * *